(12) United States Patent
Deng et al.

(10) Patent No.: US 11,874,390 B2
(45) Date of Patent: Jan. 16, 2024

(54) SYSTEMS AND METHODS FOR DETERMINING POSITION AND DISTANCE OF A TERMINAL

(71) Applicant: ZHEJIANG DAHUA TECHNOLOGY CO., LTD., Zhejiang (CN)

(72) Inventors: Zhiji Deng, Hangzhou (CN); Jinbiao Shu, Hangzhou (CN); Ming Liu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 398 days.

(21) Appl. No.: 17/343,788

(22) Filed: Jun. 10, 2021

(65) Prior Publication Data

US 2021/0302531 A1   Sep. 30, 2021

Related U.S. Application Data

(63) Continuation of application No. PCT/CN2019/120006, filed on Nov. 21, 2019.

(30) Foreign Application Priority Data

Dec. 11, 2018  (CN) .......................... 201811511192.7
May 31, 2019   (CN) .......................... 201910467678.3

(51) Int. Cl.
   *G01S 5/26*        (2006.01)
   *H04W 64/00*    (2009.01)
(52) U.S. Cl.
   CPC .............. *G01S 5/26* (2013.01); *H04W 64/00* (2013.01)

(58) Field of Classification Search
   CPC ... G01S 5/26; G01S 5/30; G01S 11/14; G01S 5/0081; G01S 5/02216; G01S 5/06; H04W 64/00
   See application file for complete search history.

(56) References Cited

U.S. PATENT DOCUMENTS

| | | | | |
|---|---|---|---|---|
| 6,950,661 | B2* | 9/2005 | Watanabe | ............... G01S 1/022 342/126 |
| 8,644,821 | B2 | 2/2014 | Chang et al. | |

(Continued)

FOREIGN PATENT DOCUMENTS

| | | | |
|---|---|---|---|
| CN | 1818713 A | 8/2006 | |
| CN | 1924604 A | 3/2007 | |

(Continued)

OTHER PUBLICATIONS

The Extended European Search Report in European Application No. 19895182.4 dated Jan. 5, 2022, 10 pages.

(Continued)

*Primary Examiner* — Kabir A Timory
(74) *Attorney, Agent, or Firm* — METIS IP LLC

(57) ABSTRACT

Systems and methods for determining a time difference are provided in the present disclosure. The systems includes a first base station configured to receive a first signal transmitted from a terminal and receive a second signal from a second base station. The systems may also include the second base station configured to receive the first signal transmitted from the terminal, and transmit the second signal after receiving the first signal. The systems may further include at least one processor configured to determine a time duration between the first base station receiving the first signal and receiving the second signal and determine the time difference between a first time period of the first signal transmitted from the terminal to the first base station and a (Continued)

second time period of the first signal transmitted from the terminal to the second base station based on a third time period and the time duration.

20 Claims, 7 Drawing Sheets

(56) References Cited

U.S. PATENT DOCUMENTS

| | | |
|---|---|---|
| 2005/0096066 A1 | 5/2005 | Lee |
| 2006/0034250 A1 | 2/2006 | Kim et al. |
| 2007/0171853 A1 | 7/2007 | Jones et al. |
| 2009/0122813 A1 | 5/2009 | Zhang |
| 2010/0109849 A1 | 5/2010 | Wang et al. |
| 2011/0222373 A1 | 9/2011 | Lee |
| 2012/0014312 A1 | 1/2012 | Zhang et al. |
| 2013/0041526 A1 | 2/2013 | Ouyang |
| 2013/0265992 A1 | 10/2013 | Deng et al. |
| 2015/0156750 A1* | 6/2015 | Quan ............ H04W 56/0045 370/329 |
| 2018/0014160 A1 | 1/2018 | Wootton et al. |

FOREIGN PATENT DOCUMENTS

| | | |
|---|---|---|
| CN | 101184277 A | 5/2008 |
| CN | 101448314 A | 6/2009 |
| CN | 102045830 A | 5/2011 |
| CN | 103235285 A | 8/2013 |
| CN | 103876702 A | 6/2014 |
| CN | 105548962 A | 5/2016 |
| CN | 105897330 A | 8/2016 |
| CN | 106851696 A | 6/2017 |
| CN | 107231614 A | 10/2017 |
| CN | 109714700 A | 5/2019 |
| CN | 110231612 A | 9/2019 |
| EP | 1135875 B1 | 7/2007 |
| KR | 20070105954 A | 10/2007 |

OTHER PUBLICATIONS

International Search Report in PCT/CN2019/120006 dated Feb. 5, 2020, 7 Pages.
Written Opinion in PCT/CN2019/120006 dated Feb. 5, 2020, 7 Pages.
First Office Action in Chinese Application No. 201811511192.7 dated Feb. 3, 2020, 10 pages.
First Office Action in Chinese Application No. 201910467678.3 dated Oct. 14, 2020, 32 pages.
Liu, Jun et al., Research and Improvement of Cricket Indoor Location System, Computer Technology and Development, 21(5): 206-209, 2011.
Wang, Hongpeng et al., Design and Implementation of Indoor Location System for Wireless Sensor Networkbased on Cricket, Computer Engineering and Applications, 2008, 5 pages.
Wang, Xu et al., Indoor Assist System for Rescue Based on Wireless Sensor, Computer Engineering, 36(12): 248-250, 2010.

* cited by examiner

SYSTEMS AND METHODS FOR DETERMINING POSITION AND DISTANCE OF A TERMINAL

CROSS-REFERENCE TO RELATED APPLICATIONS

This application is a continuation of International Patent Application No. PCT/CN2019/120006, filed on Nov. 21, 2019, which claims priority to Chinese Patent Application No. 201811511192.7, filed on Dec. 11, 2018, and Chinese Patent Application No. 201910467678.3, filed on May 31, 2019, the contents of each of which are hereby incorporated by reference.

TECHNICAL FIELD

This disclosure generally relates to communication technology, and more particularly, to methods and systems for determining the position of a terminal and measuring a distance of the terminal based on communications between the terminal and base stations.

BACKGROUND

Communications between base stations and various objects (terminals) are often used to determine the position and distance of the objects.

For position determination, a time of fight (TOF) method is commonly employed in cases where the object and multiple base stations are asynchronous. However, this conventional approach often requires the object to perform TOF measuring with each base station by transmitting and receiving interactive signals with the base station, resulting in a prolonged determining time, low efficiency, and a waste of energy consumption.

When measuring a distance between the object and the base station, RFID (Radio Frequency Identification), Bluetooth, WIFI, or other RF signals are commonly used. With a conventional method, the base station usually receives RF signals transmitted by the object and determines the distance between the object and the base station based on the signal strength. The disadvantage of this method is that the signal strength is greatly affected by the environment, thus the distance is not accurate. To ensure accuracy, a large number of base stations are often used for simultaneous measuring to determine an average value of signal intensity, which results in high cost and low efficiency.

Therefore, it is desirable to develop systems and methods that can determine the position and distance of objects (terminals) with high accuracy and improved efficiency.

SUMMARY

Embodiments of the present disclosure provide a system for determining a time difference and a target distance between a terminal and a base station, as well as a process thereof. Specifically, it may include the following aspects.

In a first aspect, the present disclosure discloses a process for determining a time difference. The process may comprise receiving, by a first base station, a first signal transmitted from a terminal, wherein the first signal includes identity information of the terminal and receiving, by the first base station, a second signal from a second base station, wherein the second signal is transmitted by the second base station after the second base station receives the first signal, and the second signal includes the identity information of the terminal. The process may also comprise determining a time duration between the first base station receiving the first signal and receiving the second signal. The process may further comprise determining the time difference between a first time period of the first signal transmitted from the terminal to the first base station and a second time period of the first signal transmitted from the terminal to the second base station based on a third time period and the time duration, wherein the third time period is a time period of the second signal transmitted from the second base station to the first base station. In some embodiments, the second signal is transmitted by the second base station after a time interval from the second base station receiving the first signal.

In some embodiments, the time interval may be a random interval or a preset interval.

In some embodiments, the process may further comprise determining the time difference based on the time interval.

In some embodiments, the second signal may further include at least one of identity information of the second base station, a position of the second base station, or the time interval.

In some embodiments, the process may further comprise determining the third time period based on the position of the second base station and a position of the first base station, or determining the third time period based on interaction signal between the first base station and the second base station.

In some embodiments, the process may further comprise determining whether the time duration is more than a threshold; and in response to a determination that the time duration is less than or equal to the threshold, determining the time difference based on the third time period and the time duration.

In some embodiments, the process may further comprise determining a position of the terminal based on the time differences and positions of base stations.

In some embodiments, the process may further comprise synchronizing the first base station and the second base station based on the time difference.

In a second aspect, the present disclosure discloses a process implemented on a system having a target base station for determining a target distance between a terminal and the target base station. The process may comprise transmitting, by the target base station, a first ultrasound signal at a first time point. The process may also comprise receiving, by the target base station, a first radiofrequency (RF) signal after a first time period from the first time point, wherein the first RF signal is transmitted by the terminal after a first time interval from the terminal receiving the first ultrasound signal. The process may further comprises determining whether the first time period is less than a first threshold, and in response to a determination that the first time period is less than the first threshold, determining the target distance between the terminal and the target base station based on the first time period and the first time interval.

In some embodiments, the first RF signal may include information of the terminal or the first time interval.

In some embodiments, the first time interval may be a random interval or a preset interval.

In some embodiments, the first threshold may be determined based on the first time interval and an effective working range of the target base station.

In some embodiments, the process may further comprises receiving, by the target base station, a second RF signal after a second time period from the first time point, wherein the second RF signal is transmitted by the terminal after a second time interval from the terminal receiving a second ultrasound signal.

In some embodiments, the second ultrasound signal may be transmitted by another base station of the system.

In some embodiments, the process may further comprises determining whether the second time period is more than a second threshold. The process may comprise in response to a determination that the second time period is less than or equal to the second threshold, transmitting, by the target base station, a third ultrasound signal after a third time interval from the first time point, and in response to a determination that the second time period is more than the second threshold, transmitting, by the target base station, the third ultrasound signal after a fourth time interval from a second time point when the target base station receives the second RF signal. The third time interval may be determined based on a count of base stations in a predetermined range and the first threshold. The fourth time interval may be determined based on the third time interval, the count of base stations in the predetermined range, and the first threshold. And the second threshold may be determined based on the third time interval and the fourth time interval.

In some embodiments, the third time interval, the fourth time interval, or the second threshold may be determined by the system or by a user.

In some embodiments, the process may further comprises in response to a determination that the second time period is no more than the second threshold, transmitting, by the target base station, the third ultrasound signal after a sum of the third time interval and a random value from the first time point.

In some embodiments, the process may further comprises receiving, by the target base station, a third RF signal at a third time point and transmitting, by the target base station, the first ultrasound signal at the first time point. The first time point may be a time point after a fifth time interval from the third time point, and the fifth time interval may be determined based on a count of base stations in a predetermined range and the first threshold.

In a third aspect, the present disclosure discloses systems for determining a time difference. The systems may include a first base station configured to receive a first signal transmitted from a terminal and receive a second signal from a second base station, wherein the first signal may include identity information of the terminal. The systems may also include the second base station configured to receive the first signal transmitted from the terminal, and transmit the second signal after receiving the first signal, wherein the second signal includes the identity information of the terminal. The systems may further include at least one processor configured to determine a time duration between the first base station receiving the first signal and receiving the second signal and determine a time difference between a first time period of the first signal transmitted from the terminal to the first base station and a second time period of the first signal transmitted from the terminal to the second base station based on a third time period and the time duration, wherein the third time period may be a time period of the second signal transmitted from the second base station to the first base station.

In a fourth aspect, the present disclosure discloses systems for determining a target distance between a terminal and a target base station. The systems may include the target base station configured to transmit a first ultrasound signal at a first time point, and receive a first radiofrequency (RF) signal after a first time period from the first time point. The terminal configured to transmit the first RF signal after a first time interval from receiving the first ultrasound signal. The systems may also include at least one processor configured to determine whether the first time period is less than a first threshold, and in response to a determination that the first time period is less than the first threshold, determine the target distance between the terminal and the target base station based on the first time period and the first time interval.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
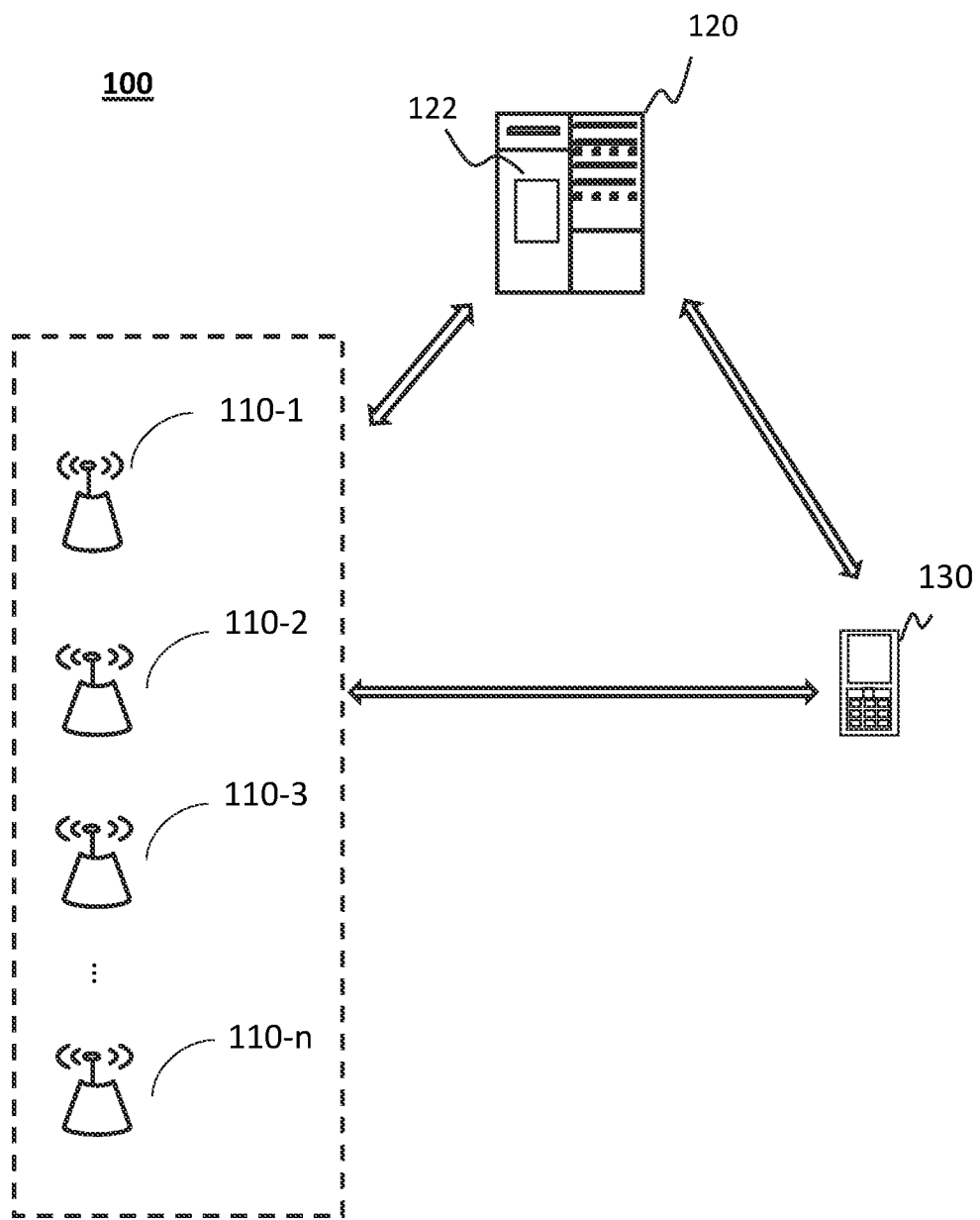
FIG. 1 is a schematic diagram illustrating an exemplary system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the apparatus may be referred to in various ways according to some embodiments of the present disclosure, however, any number of different modules may be used and operated in the apparatus. These modules are intended to be illustrative, not intended to limit the scope of the present disclosure. Different modules may be used in different aspects of the apparatus and method.

According to some embodiments of the present disclosure, flow charts are used to illustrate the operations performed by the apparatus. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

An aspect of the present disclosure relates to systems and methods for determining a time difference. The systems may include a first base station configured to receive a first signal transmitted from a terminal and receive a second signal from a second base station, wherein the first signal may include identity information of the terminal. The systems may also include the second base station configured to receive the first signal transmitted from the terminal, and transmit the second signal after receiving the first signal, wherein the second signal includes the identity information of the terminal. The systems may further include at least one processor configured to determine a time duration between the first base station receiving the first signal and receiving the second signal and determine a time difference between a first time period of the first signal transmitted from the terminal to the first base station and a second time period of the first signal transmitted from the terminal to the second base station based on a third time period and the time duration, wherein the third time period may be a time period of the second signal transmitted from the second base station to the first base station.

Another aspect of the present disclosure relates to systems and methods for determining a target distance between a terminal and a target base station. The systems may include the target base station configured to transmit a first ultrasound signal at a first time point, and receive a first radiofrequency (RF) signal after a first time period from the first time point. The terminal configured to transmit the first RF signal after a first time interval from receiving the first ultrasound signal. The systems may also include at least one processor configured to determine whether the first time period is less than a first threshold, and in response to a determination that the first time period is less than the first threshold, determine the target distance between the terminal and the target base station based on the first time period and the first time interval.

FIG. 1 is a schematic diagram illustrating an exemplary system according to some embodiments of the present disclosure. The system 100 may be a position determining system or a distance measuring system. In some embodiments, the system 100 may determine a position of a terminal 130. In some embodiments, the system 100 may determine a distance between the terminal 130 and a base station of the system 100. As illustrated in FIG. 1, the system 100 may include a plurality of base stations 110 and a processing engine 120.

The plurality of base stations 110 may include a first base station 110-1, a second base station 110-2, a third base station 110-3, . . . , and a nth base station 110-n, where n is an integer and n≥2. The plurality of base stations 110 may locate at different positions, each of the plurality of base stations 110 may have a position. The time of the plurality of base stations 110 may be asynchronous or synchronous with each other.

In some embodiments, the plurality of base stations 110 may be the same. For example, each of the plurality of base stations 110 may be configured to receive and transmit signal. The plurality of base stations 110 may be configured to further transmit ultrasound signal. In some embodiments, the plurality of base stations 110 may be configured to transmit ultrasound signal regularly. A first time interval between a first base station transmitting two adjacent ultrasound signals may be the same or different with a second time interval between a second base station transmitting two adjacent ultrasound signals. In some embodiments, the base station may be configured to transmit the ultrasound signal at a predetermined or random time point. The base station may also adjust a time point for transmitting a next ultrasound signal.

In some embodiments, the plurality of base stations 110 may be different. For example, some of the plurality of base stations 110 (e.g., the first base station 110-1) may be configured to receive and transmit signal, some of the plurality of base stations 110 (e.g., the second base station 110-2) may only receive signal, and some of the plurality of base stations 110 (e.g., the third base station 110-3) may be configured to transmit ultrasound signal and receive signal. For another example, some of the plurality of base stations 110 (e.g., the second base station 110-1) may be configured to receive and transmit signal, and some of the plurality of base stations 110 (e.g., the second base station 110-2) may be configured to transmit ultrasound signal and receive signal.

In some embodiments, the plurality of base stations 110 may receive signal transmitted from the terminal 130 and determine the position of the terminal 130. For example, the plurality of base stations 110 (e.g., the first base station 110-1 or the second base station 110-2) may receive a first signal transmitted by the terminal 130. The first signal transmitted by the terminal 130 may include identity information of the terminal 130. In some embodiments, at least one of the plurality of base stations 110 (e.g., the second base station 110-2) may be configured to transmit a second signal after receiving the first signal, and at least one of the plurality of base stations 110 (e.g., the first base station 110-1) may receive the second signal. The second signal may include the identity information of the terminal 130 and identity information of the at least one of the plurality of base stations 110 which transmitting the second signal (e.g., the second base station 110-2).

In some embodiments, a base station of the plurality of base stations 110 (e.g., the first base station 110-1) may transmit an ultrasound signal and receive a radiofrequency (RF) signal transmitted by the terminal 130, and determine the distance between the base station (e.g., the first base station 110-1) and the terminal 130. In some embodiments, the RF signal may be transmitted by the terminal 130 after the terminal 130 receiving the ultrasound signal. The RF signal may include identity information of the terminal 130.

The processing engine 120 may be configured to receive data from the plurality of base stations 110 and process the data to determine the position of the terminal 130 or determine the distance between a base station (e.g., the first base station 110-1) and the terminal 130. The processing engine 120 may further synchronize the time of the plurality of base stations 110 based on the processed data.

In some embodiments, the processing engine 120 may determine a time interval between a base station (e.g., the first base station 110-1) receiving two signals. For example, the processing engine 120 may determine a first time point when the base station receives a first signal, determine a second time point when the base station receives a second signal, and then determine the time interval based on the first time point and the second time point. For another example, the processing engine 120 may determine the time interval by starting timing when the base station receives a first signal, and terminating the timing when the base station receives a second signal.

In some embodiments, the processing engine 120 may determine a time period of a signal being transmitted from one base station (e.g., the second base station 110-2) to another base station (e.g., the first base station 110-1) of the plurality of base stations 110. For example, the processing engine 120 may obtain a first position of the first base station 110-1 and a second position of the second base station 110-2, and determine a distance between the first base station 110-1 and the second base station 110-2 based on the first position of the first base station 110-1 and the second position of the second base station 110-2. The processing engine 120 may further determine the time period of the signal being transmitted from the second base station 110-2 to the first base station 110-1 based on the distance and a speed of the signal. In some embodiments, the signal may include an electromagnetic signal, and the speed of the signal may be c. In some embodiments, the signal may include an acoustic signal, and the speed of the acoustic signal may be 340 m/s. In some embodiments, the processing engine 120 may determine the time period based on interaction signal transmitted between the first base station 110-1 and the second base station 110-2. For example, the first base station 110-1 may transmit a first signal. The second base station 110-2 may receive the first signal, and may transmit a second signal after a time delay $t_d$ from receiving the first signal, wherein the time delay may be 0 or any other values more than 0. Then the first base station 110-1 may receive the second signal. The processing engine 120 may determine a time interval $T_{12}$ between the first base station 110-1 transmitting the first signal and receiving the second signal, and then determine the time period $\Delta t$ based on the time interval $T_{12}$ and the time delay $t_d$ as follows:

$$\Delta t = (T_{12} - t_d)/2 \quad (1)$$

In some embodiments, the processing engine 120 may determine another time interval between a base station of the plurality of base stations 110 (e.g., the first base station 110-1) transmitting an ultrasound signal and receiving a RF signal. The RF signal may be transmitted by the terminal 130 after the terminal 130 receiving the ultrasound signal. For example, the processing engine 120 may determine a first time point when the first base station 110-1 transmits the ultrasound signal, determine a second time point when the first base station 110-1 receives the RF signal, and then determine the time interval based on the first time point and the second time point. For another example, the processing engine 120 may determine the time interval by starting timing when the first base station 110-1 transmits the ultrasound signal, and terminating the timing when the first base station 110-1 receives the RF signal.

In some embodiments, the processing engine 120 may include a processor and a storage 122. The storage 122 may store data and/or instructions. The data may include positions of the plurality of base stations 110, time period of a signal being transmitted from one base station to another base station, signal or information obtained from the plurality of base stations 110, etc. In some embodiments, the storage 122 may store data and/or instructions that the processing engine 120 may execute or use to perform exemplary processes described in the present disclosure. In some embodiments, the storage 122 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 122 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the processing engine 120 may connect to the plurality of base stations 110 via a network. The network may include any suitable network that can facilitate the exchange of information and/or data within the system 100 or between a component of the system 100 and an external device. In some embodiments, one or more components of the system 100 (e.g., the base station, the processing engine 120) may exchange information and/or data with one or more other components of the system 100 via the network. For example, the processing engine 120 may receive data from each of the base station directly or via the network. The network may be a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network (VPN), a satellite network, a telephone network, routers, hubs, switches, server computers, or the like, or any combination thereof. Merely by way of example, the network may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network may include one or more network access points. For example, the network may include wired and/or wireless network access points and/or internet exchange points through which one or more components of the system 100 may be connected to the network to exchange data and/or information.

In some embodiments, the processing engine 120 may be integrated to at least one of the plurality of base stations 110. For example, the processing engine 120 may be integrated to the first base station 110-1, the second base station 110-2, or the third base station 110-3. For another example, the processing engine 120 may be integrated to each of the plurality of base stations 110.

In some embodiments, the processing engine 120 may be a single server or a server group. The server group may be centralized or distributed. In some embodiments, the processing engine 120 may be local to or remote from other components of the system 100. In some embodiments, the processing engine 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 120 may be implemented by a computing device 200 having one or more components illustrated in FIG. 2.

The terminal 130 may be configured to transmit a signal. The signal may be an electromagnetic signal. For example, the signal may be a RF signal. The signal may include identity information of the terminal 130. In some embodiments, the terminal 130 may be configured to transmit the signal regularly. For example, the terminal 130 may transmit the signal every a preset time interval. The preset time interval may be any time interval. For example, the preset time interval may be in a range of 0.001 ms-10 s. For another example, the preset time interval may be 0.1 s, 0.2 s, 0.3 s, 0.5 s, 1 s, 3 s, 5 s, etc. In some embodiments, the terminal 130 may be configured to transmit the signal when the terminal 130 receives an ultrasound signal. In some embodiments, the terminal 130 may be configured to transmit the signal after a time interval from the terminal 130 receiving the ultrasound signal. The time interval may be a random time interval or a preset time interval. The time interval may be determined by the terminal 130 or the system 100 from a predetermined range. In some embodiments, the signal transmitted by the terminal 130 may include the value of the time interval.

In some embodiments, the terminal 130 may start to work (e.g., transmit the RF signals) when the terminal 130 receives the ultrasound signal and does not work at other times. For example, after the terminal 130 transmitting the signal, the terminal 130 may turn on a sleep mode until the terminal 130 receives an ultrasound signal or a time point when the terminal 130 transmits a next signal is reached.

The terminal 130 may include a mobile device, a tablet computer, a laptop computer, etc. In some embodiments, the mobile device may include a smart home device, a wearable device, a mobile device, a virtual reality device, an augmented reality device, or the like, or any combination thereof. Exemplary smart home device may include a smart lighting device, a control device of an intelligent electrical apparatus, a smart monitoring device, a smart television, a smart video camera, an interphone, or the like, or any combination thereof. Exemplary wearable device may include a bracelet, footgear, eyeglasses, a helmet, a watch, clothing, a backpack, a smart accessory, or the like, or any combination thereof. Exemplary mobile device may include a mobile phone, a personal digital assistant (PDA), a gaming device, a navigation device, a point of sale (POS) device, a laptop, a tablet computer, a desktop, or the like, or any combination thereof. Exemplary virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal 130 may be implemented on the computing device 200.

It should be noted that the above description of the system 100 is merely provided for illustration, and not intended to limit the scope of the present disclosure. For persons having ordinary skills in the art, multiple variations and modifications may be made under the teachings of the present disclosure. For example, the assembly and/or function of the system 100 may be varied or changed according to specific implementation scenarios. Merely by way of example, some other components may be added into the system 100. However, those variations and modifications do not depart from the scope of the present disclosure.

Figure 2:
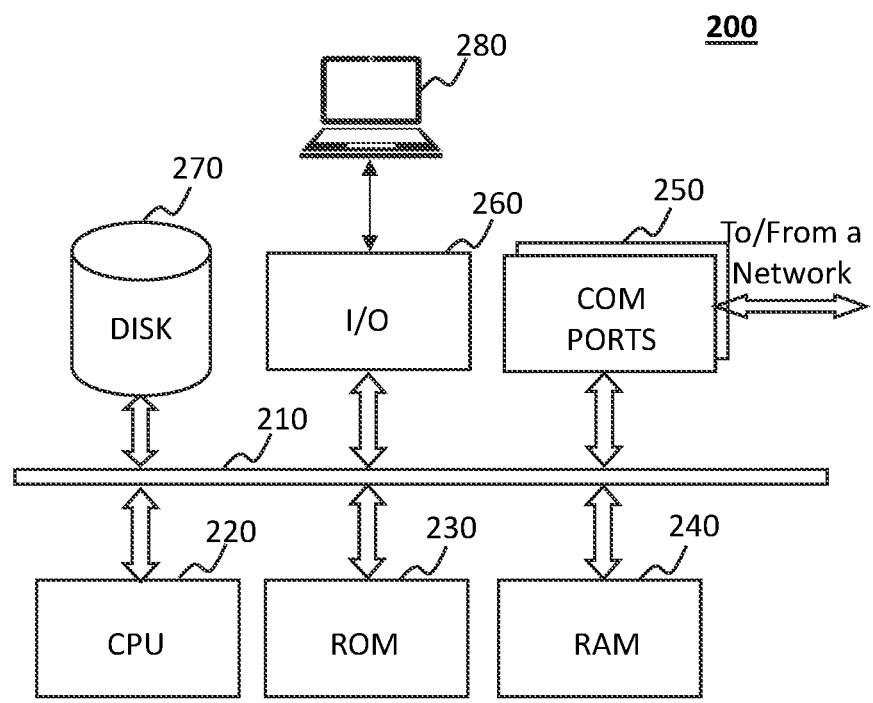
FIG. 2 is a schematic diagram illustrating hardware and/or software components of an exemplary computing device according to some embodiments of the present disclosure.

FIG. 2 is a schematic diagram illustrating hardware and/or software components of an exemplary computing device on which the processing engine 120 may be implemented according to some embodiments of the present disclosure. For example, the processing engine 120 may be implemented on the computing device 200 and configured to perform functions of the processing engine 120 disclosed in this disclosure.

The computing device 200 may be a general purpose computer or a special purpose computer. Both may be used to implement the processing engine 120 of the present disclosure. For example, the processing engine 120 of the system 100 may be implemented on the computing device 200, via its hardware, software program, firmware, or a combination thereof. Although only one such computer is shown for convenience, the computer functions related to the system 100 as described herein may be implemented in a distributed manner on a number of similar platforms to distribute the processing load.

The computing device 200, for example, may include communication (COMM) ports 250 connected to and from a network connected thereto to facilitate data communications. The computing device 200 may also include a processor (e.g., a central processing unit (CPU)) 220, in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computer device 200 may include program storage and data storage of different forms, for example, a storage 270, and a read only memory (ROM) 230, or a random access memory (RAM) 240, for various data files to be processed and/or transmitted by the computer. The computing device 200 may also include program instructions stored in the ROM 230, the RAM 240, and/or other type of non-transitory storage medium to be executed by the processor 220. The methods and/or processes of the present disclosure may be implemented as the program instructions. In some embodiments, the storage 270 may store data acquired from the plurality of base stations 110. In some embodiments, the storage 270 may store data and/or instructions that the processing engine 120 may execute or use to perform exemplary processes or methods described in the present disclosure.

In some embodiments, the storage 270 may include a mass storage, removable storage, or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. In some embodiments, the storage 270 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The computing device 200 may also include an I/O component 260, supporting input/output between the computer and other components therein. The computing device 200 may also receive programming and data via network communications.

Merely for illustration purposes, only one processor is described in the computing device 200. However, it should be noted that the computing device 200 in the present disclosure may also include multiple processors. Thus operations that are performed by one processor as described in the present disclosure may also be jointly or separately performed by the multiple processors. For example, the processor of the computing device 200 executes both operation A and operation B. As another example, operation A and operation B may also be performed by two different processors jointly or separately in the computing device 200 (e.g., the first processor executes operation A and the second processor executes operation B, or the first and second processors jointly execute operations A and B).

Figure 3:
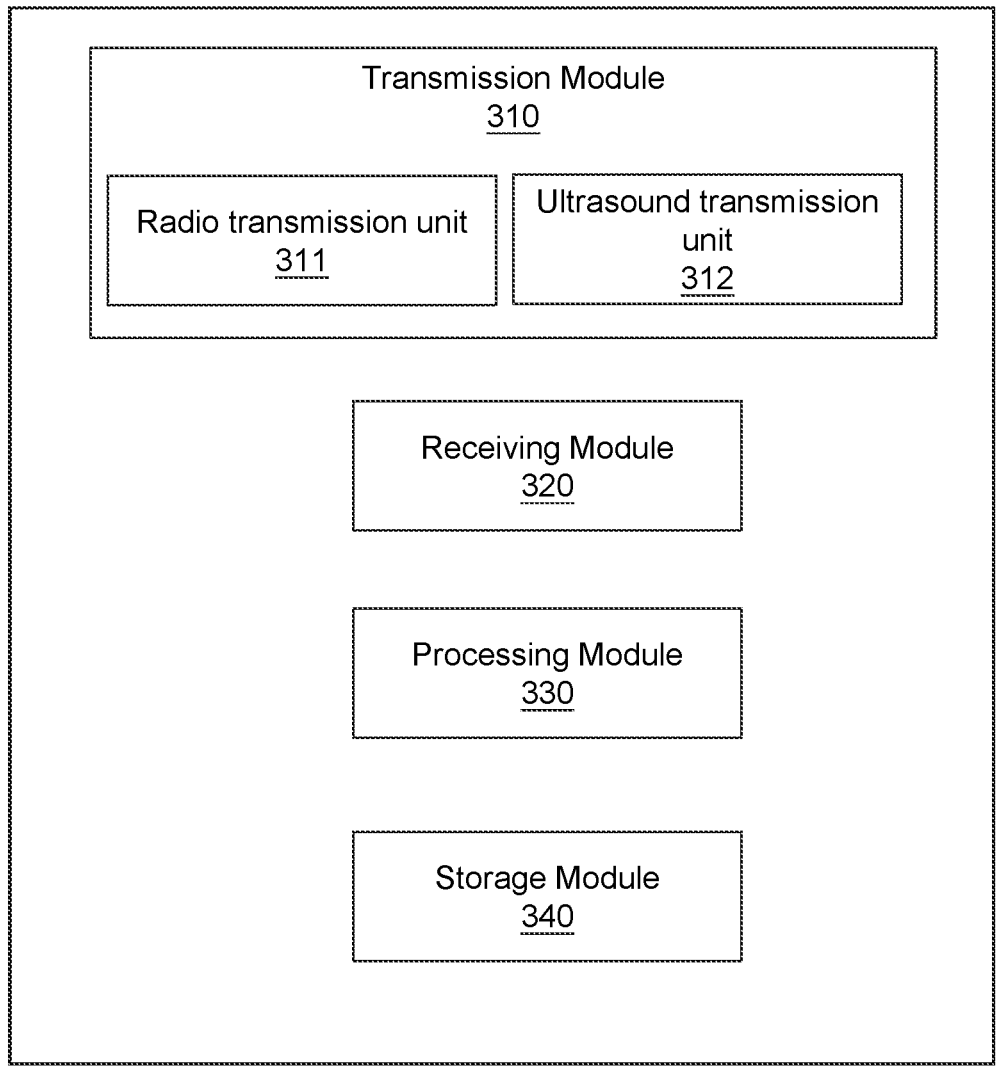
FIG. 3 is a block diagram illustrating an exemplary base station according to some embodiments of the present disclosure.

FIG. 3 is a block diagram illustrating an exemplary base station according to some embodiments of the present disclosure. As illustrated in FIG. 3, the base station of the plurality of base stations 110 may include a transmission module 310, a receiving module 320, a processing module 330, and a storage module 340.

The transmission module 310 may be configured to transmit signal. In some embodiments, the transmission module 310 may include a radio transmission unit 311 or an ultrasound transmission unit 312. The radio transmission unit 311 may be configured to transmit electromagnetic signal. The electromagnetic signal may include radio signal having various frequencies or RF signals. The ultrasound transmission unit 312 may be configured to transmit ultrasound signal or other sound waves in different frequency bands other than the ultrasound, including an Infrasound with a frequency less than 20 Hz, and a sound wave with a frequency from 20 Hz to 20 KHz. In some embodiments, the ultrasound transmission unit 312 may be a loudspeaker, an emitter, etc.

In some embodiments, the plurality of base stations 110 may have different kind of base stations. For example, the transmission module 310 of some base stations (e.g., the first base station 110-1) may only include the radio transmission unit 311, thus the first base station 110-1 may be configured to transmit an electromagnetic signal. For another example, the transmission module 310 of some base station (e.g., the second base station 110-2) may only include the ultrasound transmission unit 312, thus the second base station 110-2 may be configured to transmit ultrasound signal. For a further example, the transmission module 310 of some base station (e.g., the third base station 110-3) may include the radio transmission unit 311 and the ultrasound transmission unit 312, thus the third base station 110-3 may transmit both the electromagnetic signal and the ultrasound signal.

In some embodiments, the plurality of base stations 110 may have the same base station. For example, the transmission module 310 of each base station of the plurality of base stations 110 may include at least one of the radio transmission unit 311 or the ultrasound transmission unit 312.

The receiving module 320 may be configured to receive signal. The signal may include electromagnetic signal or acoustic signal. For example, the receiving module 320 may receive radio signal, RF signal, ultrasound signal, infrasound signal, or the like, or any combination thereof. The receiving module 320 may receive any type of radio waves. In some embodiment, the receiving module 320 may be a radio frequency identification (RFID) module, a Bluetooth, a wireless receiving and transmitting (also referred to as RF 433) module, a long range radio (also referred to as lora) module, or the like, or any combination thereof.

The processing module 330 may be configured to control the transmission module 310 to transmit signal. The processing module 330 may also acquire signal from the receiving module 320 and process the signal. The processing module 330 may identify information in the received signal. In some embodiments, the processing module 330 may also be configured to control the transmission module 310 to transmit a second signal after the receiving module 320 receives a first signal. In some embodiments, the processing module 330 may identify information in the first signal, and add the identified information in the first signal to the second signal. The processing module 330 may control the transmission module 310 to transmit the second signal after a time interval from the receiving module 320 receiving the first signal. The time interval may be a random interval or a preset interval determined by the processing module 330 or by a user. In some embodiments, the processing module 330 may also add the value of the time interval to the second signal. The time interval may be any value more than or equal to 0. The time interval may be in a predetermined range. For example, the time interval may be in a range of 0.01 us-10 s. For another example, the time interval may be 0.1 us, 1 us, 10 us, 100 us, 1 ms, 10 ms, 100 ms, 1 s, etc.

In some embodiments, the processing module 330 may determine a time point when the transmission module 310 transmits a signal or the receiving module 320 receives a signal. In some embodiments, the processing module 330 may also determine a time interval between two events by starting timing when a first event occurs and terminating the timing when a second event occurs. The event may include the transmission module 310 transmitting a signal or the receiving module 320 receiving a signal. For example, the first event may be the transmission module 310 transmitting a first signal and the second event may be the transmission module 310 transmitting a second signal. For another example, the first event may be the receiving module 320 receiving a first signal and the second event may be the receiving module 320 receiving a second signal. For a further example, the first event may be the transmission module 310 transmitting a first signal and the second event may be the receiving module 320 receiving a second signal. For a still example, the first event may be the receiving module 320 receiving a first signal and the second event may be the transmission module 310 transmitting a second signal.

In some embodiments, the processing module 330 may include one or more processors. Merely by way of example, the processing module 330 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing module 330 may be implemented on the processing engine 120 (e.g., the processor 220 of the computing device 200) when the processing engine 120 is integrated in the base station.

The storage module 340 may be configured to store signal received by the receiving module 320, information identified by the processing module 330, or the like, or any combination thereof. In some embodiments, the storage module 340 may include a mass storage, removable storage, a volatile read-and-write memory, a read-only memory (ROM), or the like, or any combination thereof. The mass storage may include a magnetic disk, an optical disk, a solid-state drive, etc. The removable storage may include a flash drive, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage module 340 may store one or more programs and/or instructions that may be executed by the base station (e.g., the processing module 330) to perform exemplary methods and/or processes described in the disclosure. For example, the storage module 340 may store programs and/or instructions executed by the processing module 330 of base station to control the transmission module 310, analyze the signal received by the receiving module 320, determine a time point corresponding to an event, or determine a time interval between two events.

Modules of the base station may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the transmission module 310 and receiving module 320 may be combined into a single module that may be configured to transmit and receive signal.

Figure 4:
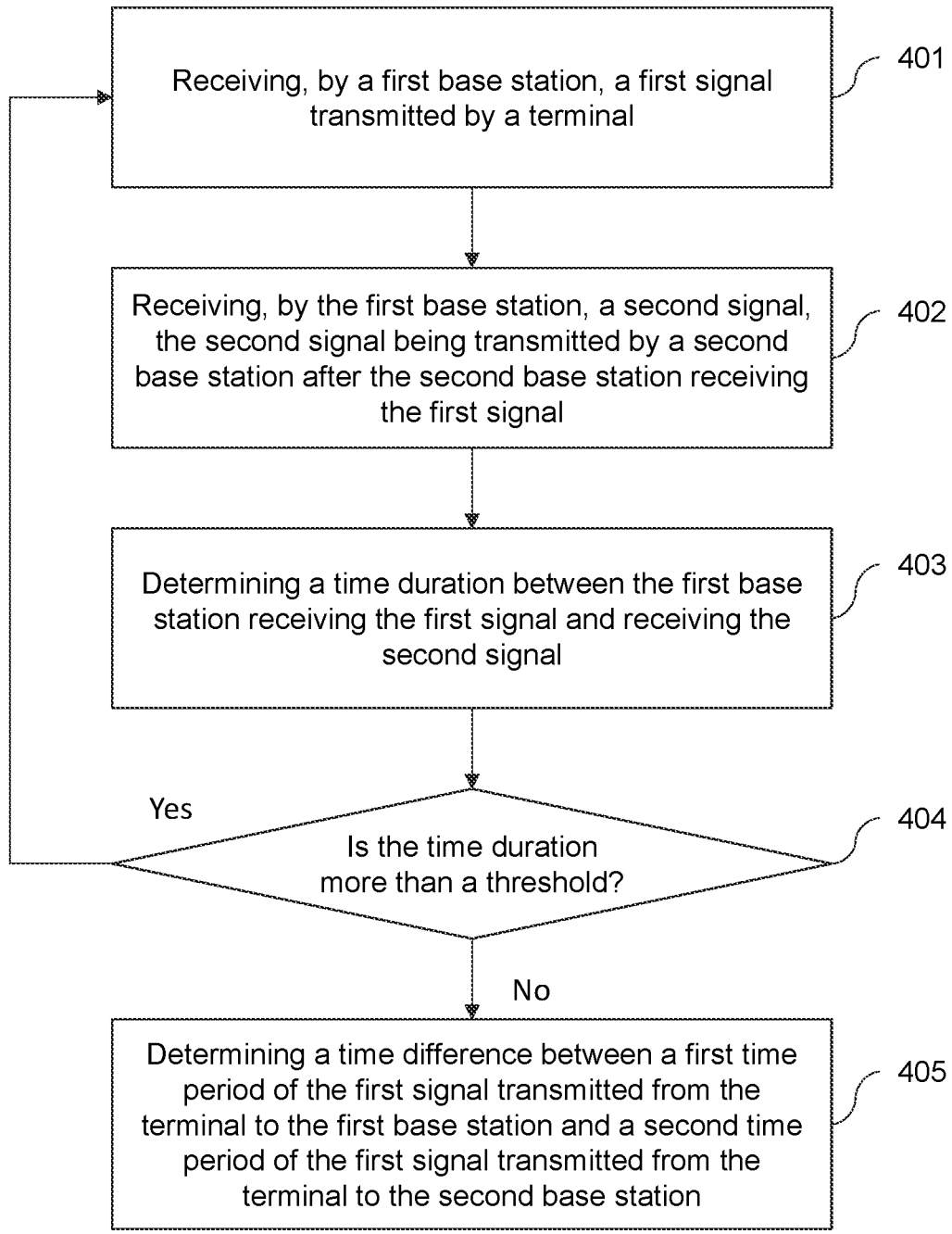
FIG. 4 is a flow chart illustrating an exemplary process for determining a time difference according to some embodiments of the present disclosure.

FIG. 4 is a flow chart illustrating an exemplary process for determining a time difference according to some embodiments of the present disclosure. The process 400 may be executed by the system 100. For example, the process 400 may be implemented as a set of instructions stored in the storage 270 or storage module 340. The processing engine 120 or the plurality of base stations 110 may execute the set of instructions, and when executing the instructions, the processing engine 120 or the plurality of base stations 110 may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process 400 as illustrated in FIG. 4 and described below is not intended to be limiting.

In 401, the plurality of base stations 110 (e.g., the first base station 110-1, the second base station 110-2) may receive a first signal. The first signal may be transmitted by the terminal 130. The terminal 130 may be moveable or static. The first signal may be an electromagnetic signal. For example, the first signal may be an RF signal. The first signal may include identity information of the terminal 130. In some embodiments, the terminal 130 may be configured to transmit the first signal regularly. For example, the terminal 130 may transmit the first signal every a preset time interval. The preset time interval may be any value more than 0. For example, the preset time interval may be in a range of 1 us-10 s. For another example, the preset time interval may be 0.1 s, 0.2 s, 0.3 s, 0.5 s, 1 s, 3 s, 5 s, etc. In some embodiments, the first signal transmitted by the terminal 130 may further include the preset time interval. In some embodiments, the terminal 130 may be configured to transmit the first signal at predetermined time points.

After the terminal 130 transmits the first signal, the plurality of base stations 110 (e.g., the first base station 110-1, the second base station 110-2) may receive the first signal. A first distance between the terminal 130 and the first base station 110-1 may be different from a second distance between the terminal 130 and the second base station 110-2, thus a first time period $\Delta T_1$ of the first signal being transmitted from the terminal 130 to the first base station 110-1 and a second time period $\Delta T_2$ of the first signal being transmitted from the terminal 130 to the second base station 110-2 may be different. In some embodiments, the first distance between the terminal 130 and the first base station 110-1 may be the same with the second distance between the terminal 130 and the second base station 110-2, thus the first time period $\Delta T_1$ of the first signal being transmitted from the terminal 130 to the first base station 110-1 and the second time period $\Delta T_2$ of the first signal being transmitted from the terminal 130 to the second base station 110-2 may be the same.

In 402, at least one of the plurality of base stations 110 (e.g., the first base station 110-1) may further receive a second signal after receiving the first signal. The second signal may be transmitted by another base station (e.g., the second base station 110-2) of the plurality of base stations 110 after receiving the first signal. For example, at least one base station of the plurality of base stations 110 (e.g., the second base station 110-2) may transmit the second signal after receiving the first signal. In some embodiments, the second base station 110-2 may transmit the second signal after a time interval $\Delta T_d$ from receiving the first signal. The time interval $\Delta T_d$ may be a random interval or a preset interval. The time interval $\Delta T_d$ may be any value more than or equal to 0. The time interval $\Delta T_d$ may be in a predetermined range. For example, the time interval $\Delta T_d$ may be in a range of 0.01 us-10 s. For another example, the time interval $\Delta T_d$ may be 0.1 us, 0.2 us, 0.3 us, 0.5 us, 1 us, 3 us, 5 us, etc. In some embodiments, the second signal may include the identity information of the terminal 130, information of the second base station 110-2, or the time interval $\Delta T_d$. The use of the time interval $\Delta T_d$ may improve the capacity of the system 100. For example, when more than one first signals transmitted by different terminals 130 reach the second base station 110-2 at the same time, the second base station 110-2 may set different time interval $\Delta T_d$ for the different second signals corresponding to the more than one first signals, thus avoiding the second signals conflicting with each other.

In some embodiments, the second base station 110-2 may receive the first signal and then transmit the second signal after a random time interval from receiving the first signal. The second signal may include the identity information of the terminal 130, the information of the second base station 110-2, and the value of the random interval. In some embodiments, the second base station 110-2 may receive the first signal and then transmit the second signal after a preset interval from receiving the first signal. The second signal may include the identity information of the terminal 130 or the information of the second base station 110-2. The second signal may further include the value of the preset interval. The information of the second base station 110-2 may include identity information of the second base station 110-2 or position of the second base station 110-2.

In some embodiments, some of the plurality of base stations 110 may transmit the second signal after the time interval $\Delta T_d$ from receiving the first signal. In some embodiments, all of the plurality of base stations 110 may transmit the second signal after the time interval $\Delta T_d$ from receiving the first signal.

In some embodiments, the processing engine 120 or the first base station 110-1 (e.g., the processing module 330) may further analyze the received first signal and second signal, and identify information in the first signal and second signal.

In 403, the processing engine 120 or the processing module 330 may determine a time duration $\Delta T$ between the first base station 110-1 receiving the first signal and the first base station 110-1 receiving the second signal. For example, the processing engine 120 or the processing module 330 may determine a first time point when the first base station 110-1 receives the first signal, determine a second time point when the first base station 110-1 receives the second signal, and then determine the time duration $\Delta T$ based on the first time point and the second time point. For another example, the processing engine 120 or the processing module 330 may determine the time duration $\Delta T$ by measuring time from the first base station 110-1 receiving the first signal up until the first base station 110-1 receiving the second signal.

In 404, the processing engine 120 or the processing module 330 may determine whether the time duration $\Delta T$ is more than a threshold. The threshold may be determined by the system 100 or a user. In some embodiments, the threshold may be determined based on the maximum second time period $\Delta T_{2max}$ of the first signal being transmitted from the terminal 130 to the second base station 110-2, the maximum time interval $\Delta T_{dmax}$, and a time period of the second signal being transmitted from the second base station 110-2 to the first base station 110-1.

If the time duration $\Delta T$ is no more than the threshold, the process 400 may proceed to 405. Otherwise, the processing engine 120 may determine that the current process fail, and the process 400 may proceed to 401, i.e., the system 100 may start a new process to determine the time difference.

In 405, the processing engine 120 or the processing module 330 may determine a time difference $\Delta T_{12}$ between the first time period $\Delta T_1$ of the first signal being transmitted from the terminal 130 to the first base station 110-1 and the second time period $\Delta T_2$ of the first signal being transmitted from the terminal 130 to the second base station 110-2. In some embodiments, the first signal may take the first time period $\Delta T_1$ transmitting from the terminal 130 to the first base station 110-1, and take the second time period $\Delta T_2$ transmitting from the terminal 130 to the second base station 110-2. The processing engine 120 or the processing module 330 may determine the time difference $\Delta T_{12}$ between the first time period $\Delta T_1$ and the second time period $\Delta T_2$ based on the time interval $\Delta T_d$, the time duration $\Delta T$, and a third time period $T_{12}$.

In some embodiments, the third time period $T_{12}$ is the time period of the second signal being transmitted from the second base station 110-2 to the first base station 110-1. In some embodiments, the processing engine 120 or the processing module 330 may determine the third time period $T_{12}$ based on a first position of the first base station 110-1, a second position of the second base station 110-2 and a speed of the second signal. For example, the processing engine 120 may determine a distance between the first base station 110-1 and the second base station 110-2 based on the first position and the second position, and then determine the third time period $T_{12}$ based on the distance and the speed of the second signal. For another example, the processing engine 120 or the processing module 330 may determine the third time period $T_{12}$ based on interaction signal between the first base station 110-1 and the second base station 110-2. In some embodiments, the third time period $T_{12}$ may be determined by the processing engine 120 or the processing module 330 in advance and stored in the storage 122 or the storage module 340.

In some embodiments, the sum of the first time period $\Delta T_1$ and time duration $\Delta T$ is equal to the sum of the second time period $\Delta T_2$, the time interval $\Delta T_d$ and the third time period $T_{12}$, which is $\Delta T_1 + \Delta T = \Delta T_2 + \Delta T_d + T_{12}$. Accordingly, the processing engine 120 or the processing module 330 may determine the time difference $\Delta T_{12}$ as follows:

$$\Delta T_{12} = \Delta T_1 - \Delta T_2 = \Delta T_d + T_{12} - \Delta T. \quad (2)$$

It should be noted that, from equation (2), the time difference $\Delta T_{12}$ may be determined based on the time interval $\Delta T_d$, the third time period $T_{12}$, and the time duration $\Delta T$. The time interval $\Delta T_d$, the third time period $T_{12}$, and the time duration $\Delta T$ are all relative time intervals, other than absolute time points. So even if the time of the plurality of base stations 110 and the time of the terminal 130 are asynchronous with each other, the time difference $\Delta T_{12}$ may still be determined according to the process 400.

In some embodiments, the processing engine 120 or the processing module 330 may synchronize the time of the first base station 110-1 and the second base station 110-2 based on the time difference $\Delta T_{12}$. For example, after the terminal 130 transmits the first signal, the first base station 110-1 may receive the first signal at a first time point $t_1$ of the first base station 110-1, and the second base station 110-2 may receive the first signal at a second time point $t_2$ of the second base station 110-2. If the time of the first base station 110-1 and the second base station 110-2 are synchronous, the time difference $\Delta T_{12}$ may also be a time difference between the first time point $t_1$ and the second time point $t_2$, i.e., $\Delta T_{12} = \Delta T_1 - \Delta T_2 = t_1 - t_2$. Accordingly, in the case that the first base station 110-1 and the second base station 110-2 are asynchronous, the processing engine 120 or the processing module 330 may synchronize the first base station 110-1 and second base station 110-2 based on the time difference $\Delta T_{12}$.

In some embodiments, the processing engine 120 or the processing module 330 may adjust the time of the first base station 110-1 to be synchronous with the second base station 110-2 as follows:

$$t_2' + \Delta T_{12} + \Delta T' \quad (3),$$

where $t_1'$ is the synchronous time of the first base station 110-1 after adjusting, $t_2$ is the time point of the second base station 110-2 when the second base station 110-2 receives the first signal, $\Delta T'$ is a time duration of the first base station 110-1 from the first base station 110-1 receiving the first signal (i.e., the first time point $t_1$ of the first base station 110-1) to the time point the processing engine 120 or the processing module 330 performing the synchronizing.

In some embodiments, the processing engine 120 or the processing module 330 may adjust time of the second base station 110-2 to be synchronous with the first base station 110-1 as follows:

$$t_2' = t_1 - \Delta T_{12} + \Delta T'' \quad (4)$$

where $t_2'$ is the synchronous time of the second base station 110-2 after adjusting, $t_1$ is the time point of the first base station 110-1 when the first base station 110-1 receives the first signal, $\Delta T''$ is a time duration of the second base station 110-2 from the second base station 110-2 receiving the first signal (i.e., the second time point $t_2$ of the second base station 110-2) to the time point the processing engine 120 or the processing module 330 performing the synchronizing.

In some embodiments, the processing engine 120 or the processing module 330 may also determine a position of the terminal 130 based on the time difference $\Delta T_{12}$. The processing engine 120 or the processing module 330 may obtain a first position $(x_1, y_1)$ of the first base station 110-1 and a second position $(x_2, y_2)$ of the second base station 110-2. According to the time difference $\Delta T_{12}$, the processing engine 120 or the processing module 330 may determine an equation as follows:

$$\frac{\sqrt{(x_1-x_0)^2 - (y_1-y_0)^2}}{v_s} - \frac{\sqrt{(x_2-x_0)^2 - (y_2-y_0)^2}}{v_s} = \Delta T_{12}, \quad (5)$$

where $(x_0, y_0)$ is the position of the terminal 130, $v_s$ is the speed of the signal. The processing engine 120 or the processing module 330 may further determine two additional time differences according to process 400, and determine two additional equations similar to equation (5). Thus the processing engine 120 may determine the position $(x_0, y_0)$ of the terminal 130.

It should be noted that the above description of process 400 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the process 400. In the storing operation, the processing engine 120 may store signal and/or data associated with the plurality of base stations 110 or the terminal 130 in a storage as described elsewhere in the present disclosure. For another example, one or more operations (e.g., operation 404) may be omitted from the process 400. The processing engine 120 may determine the time duration $\Delta T$ and then determine the time difference $\Delta T_{12}$ based on the time interval $\Delta T_d$, the time duration $\Delta T$, and a third time period $T_{12}$ directly.

Figure 5:
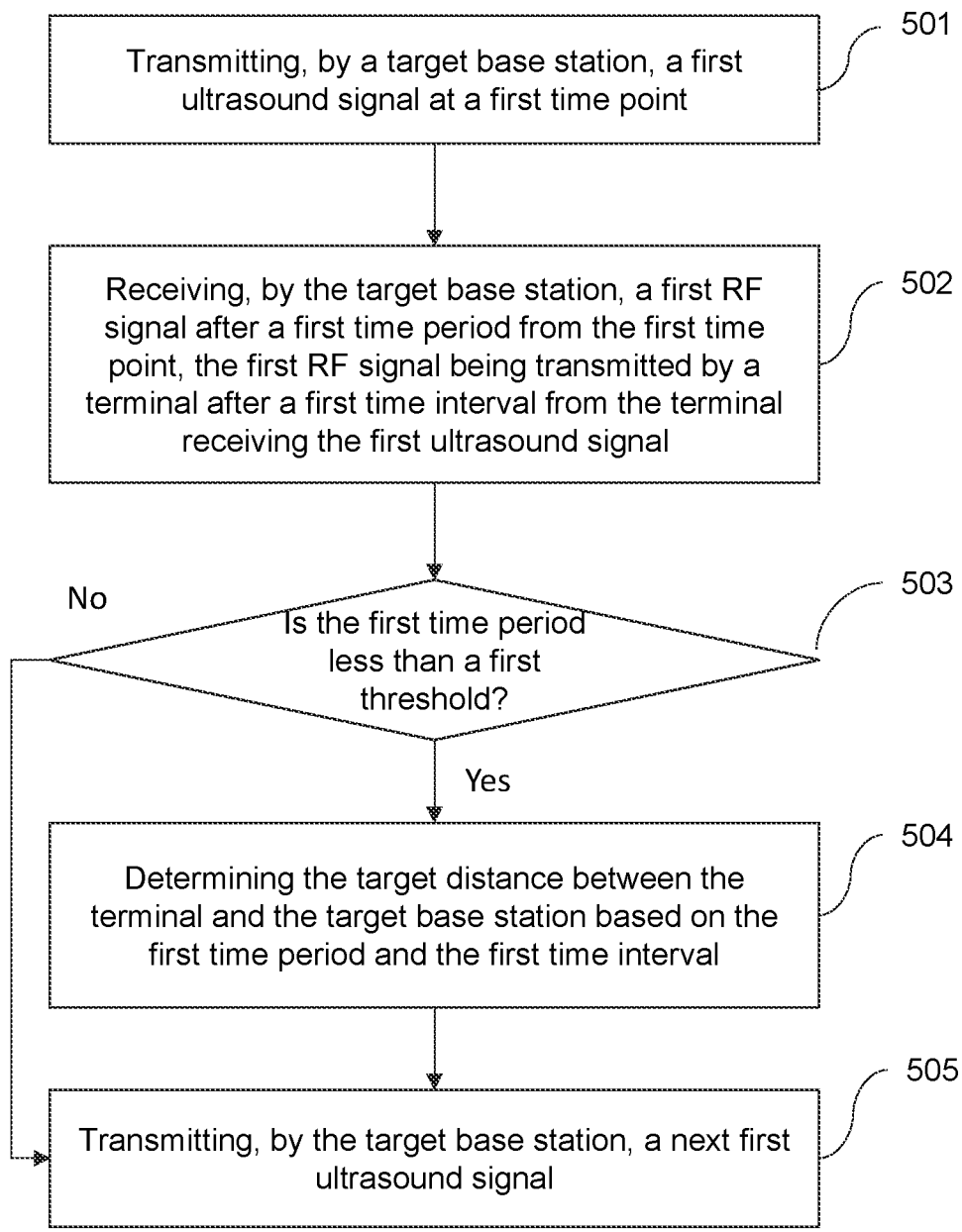
FIG. 5 is a flow chart illustrating an exemplary process for determining a target distance between a terminal and a target base station according to some embodiments of the present disclosure.

FIG. 5 is a flowchart illustrating an exemplary process for determining a target distance between a terminal and a target base station according to some embodiments of the present disclosure. In some embodiments, the process 500 may be executed by the system 100. For example, the process 500 may be implemented as a set of instructions (e.g., an application) stored in a storage device (e.g., the storage 122, the ROM 230, the RAM 240, the storage module 340). In some embodiments, the processing engine 120 or the plurality of base stations 110 may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 as illustrated in FIG. 5 and described below is not intended to be limiting.

In some embodiments, the base stations as used in the exemplary process 500 may include the transmission module 310 and/or the receiving module 320. The transmission module 310 may include the radio transmission unit 311 or the ultrasound transmission unit 312. In certain embodiments, the transmission module 310 of the base stations may only include the ultrasound transmission unit 312, not the radio transmission unit 311. In some embodiments, the terminal as used in the exemplary process 500 may include an ultrasound receiver and/or an ultrasound transmitter. In certain embodiments, the terminal may include only the ultrasound receiver, not the ultrasound transmitter, which is usually larger in size and consumes more energy. Since some of the terminals are small and it would be impractical to equip the terminal with every kind of device, not having an ultrasound transmitter may, in some cases, save energy and improve efficiency when the process 500 is deployed.

In 501, a target base station (e.g., the transmission module 310 of the target base station) may transmit a first ultrasound signal at a first time point.

Figure 7:
FIG. 7 is a schematic diagram illustrating an exemplary time line of a base station according to some embodiments of the present disclosure.

An ultrasound signal may refer to a signal of a sound wave with a frequency higher than an upper audible limit (e.g., 20 KHz) of human hearing. Ultrasound may be used in many different fields of, for example, detecting object(s), determining distance(s), etc. The target base station may be any base station of the plurality of base stations 110, such as the first base station 110-1. In some embodiments, the target base station (e.g., the first base station 110-1) may be configured to transmit ultrasound signal regularly. The cycle time period the first base station 110-1 transmits the ultrasound signal may be determined by a user or by the system 100 (e.g., the processing engine 120 or the processing module 330 of the first base station 110-1). In some embodiments, the first base station 110-1 may be configured to transmit the first ultrasound signal at predetermined time points or at random time points. In some embodiments, the first base station 110-1 may determine a time point the first base station 110-1 transmitting a next ultrasound signal. As illustrated in FIG. 7, the first base station 110-1 may transmit the first ultrasound signal at time point A, i.e., the first time point $T_1$.

In 502, the first base station 110-1 (e.g., the receiving module 320) may receive a first radiofrequency (RF) signal after a first time period $\Delta T_1$ from the first time point, wherein the first RF signal is transmitted by the terminal 130 after a time interval $\Delta T_d$ from the terminal 130 receiving the first ultrasound signal. As shown in FIG. 7, the first base station 110-1 may receive the first RF signal at time point $T_3$, and the first time period $\Delta T_1$ may refer to the time period from time point $T_1$ to time point $T_3$.

When the terminal 130 is in the effective working range of the first base station 110-1, the terminal 130 may receive the first ultrasound signal. The terminal 130 may be configured to wait for a first time interval $\Delta T_d$ after receiving the first ultrasound signal and then transmit the first RF signal.

The first time interval $\Delta T_d$ may include a random interval or a preset interval determined by the terminal 130 or by the system 100. In some embodiments, the random interval may be any time interval, such as 0.01 s, 0.02 s, 0.03 s, etc. The system 100 or the terminal 130 may determine a range of the random interval and determine the first time interval $\Delta T_d$ from the range. In some embodiments, the preset interval may be an interval preset by the system 100 or by the terminal 130. The system 100 or the terminal 130 may determine a range of the preset interval and determine the first time interval $T_d$ from the range. In some embodiments, the minimum interval of the range may be 0, and the first time interval $\Delta T_d$ may include any values that more than 0. In some embodiments, the minimum interval of the range may be a value that is determined by multiplying a time period of a RF signal being transmitted from the terminal 130 to the first base station 110-1 by a count of terminals corresponding to the maximum capacity of the first base station 110-1. The time period of the RF signal being transmitted from the terminal 130 to the first base station 110-1 may be determined based on the effective working range of the first base station 110-1 and the speed of the RF signal. For example, the time period may be 1 us and the count of terminals corresponding to the maximum capacity of the first base station 110-1 may be 100, and the minimum interval may be 0.1 ms. In some embodiments, the maximum interval of the range may be any value greater than the minimum interval thereof. For illustrated purpose only, the maximum value may be 10 ms. The first time interval may be determined by the system 100 or the terminal 130 from the range of 0.1 ms to 10 ms. In some embodiments, the effective working range of the first base station 110-1 may be determined based on the effective transmitting distance of the first ultrasound signal being transmitted by the first base station 110-1. In some embodiments, the effective transmitting distance of the first ultrasound signal may be adjusted by adjusting the transmission power of the transmission module 310. In some embodiments, the effective working range of different base stations of the plurality of base stations 110 may be different or the same.

In some embodiments, the first RF signal may include information of the terminal 130 or the value of the first time interval $\Delta T_d$. The information of the terminal may include identity (ID) information, an IP address, a mac address, or the like, or any combination thereof. In some embodiments, the first RF signal may include the value of the first time interval $\Delta T_d$.

In some embodiments, the first base station 110-1 may receive the first RF signal after the first time period $\Delta T_1$ from the first time point. The first time period $\Delta T_1$ may be a time period from the first time point to a time point the first base station 110-1 receiving the first RF signal. For example, the processing module 330 may determine the first time period $\Delta T_1$ based on the first time point and the time point the first base station 110-1 receiving the first RF signal. For another example, the processing module 330 may determine the first time period $\Delta T_1$ by measuring time from the first time point up until the first base station 110-1 receives the first RF signal.

In some embodiments, the processing module 330 may analyze the first RF signal to determine the information of the terminal 130 or the first time interval $\Delta T_d$. In some embodiments, the first base station 110-1 may transmit the first time period $\Delta T_1$, the first time interval $\Delta T_d$, or the first RF signal to the processing engine 120 for further processing.

In 503, the processing engine 120 or the processing module 330 may determine whether the first time period $\Delta T_1$ is less than a first threshold. As shown in FIG. 7, the first threshold may be a time period from time point A to time point B. The first threshold may be determined by the system 100 or by a user. In some embodiments, the first threshold may be determined based on the effective working range of the first base station 110-1, first time interval $\Delta T_d$ (or the maximum interval of the range), the speed of the first ultrasound signal, or the speed of the first RF signal. The first threshold may be determined as a sum of a time period of the first ultrasound signal being transmitted from the first base station 110-1 to the terminal 130, a time period of the first RF signal being transmitted from the terminal 130 to the first base station 110-1, and the maximum interval of the range. For example, the effective working range of the first base station 110-1 may be 34 m, the speed of the first ultrasound signal may be 340 m/s, the speed of the first RF signal may be c (i.e., 3*10^8 m/s), and the maximum interval of the range may be 0.01 s. It should be noted that the speed of the first RF signal is far faster than the speed of the ultrasound signal, so in some embodiments, the time period of the first RF signal being transmitted from the terminal 130 to the first base station 110-1 may be discarded for simply computation. In this case, the first threshold may be 0.11 s. In some embodiments, the effective working range of the plurality of base stations 110 may be different, and the first thresholds corresponding to different base stations may be different. In some embodiments, the effective working range of the plurality of base stations 110 may be the same, and the first thresholds corresponding to different base stations may be same.

The first threshold of 0.11 s may denote a maximum time period it may take from the first base station 110-1 transmitting the first ultrasound signal to the first base station 110-1 receiving the first RF signal if there is a terminal in the effective working range of the first base station 110-1.

If the first time period $\Delta T_1$ is less than the first threshold, the process 500 may proceed to 504. Otherwise, the processing engine 120 or the processing module 330 may determine that the current process fail, and the process 500 may proceed to 505.

In 504, in response to a determination that the first time period $\Delta T_1$ is less than the first threshold, the processing engine 120 or the processing module 330 may determine the target distance between the terminal 130 and the first base station 110-1 based on the first time period $\Delta T_1$ and the first time interval $\Delta T_d$.

The first time period $\Delta T_1$ may be a sum of a time period of the first ultrasound signal being transmitted from the first base station 110-1 to the terminal 130, the first time interval $\Delta T_d$, and a time period of the first RF signal being transmitted from the terminal 130 to the first base station 110-1. Specifically, the first time period $\Delta T_1$ may be determined by the following equation (6):

$$\Delta T_1 = D/V_s + D/V_c + \Delta T_d \tag{6}$$

where D denotes the target distance between the terminal 130 and the first base station 110-1, $V_s$ denotes the speed of the first ultrasound signal, $V_c$ denotes the speed of the first RF signal. It should be noted that the speed of the first RF signal $V_c$ is much more faster than the speed of the ultrasound signal $V_s$, and the time period of the first RF signal being transmitted from the terminal 130 to the first base station 110-1 (e.g., $D/V_c$) may be far less than the time period of the first ultrasound signal transmitting from the first base station 110-1 to the terminal 130 (e.g., $D/V_s$), so in some embodiments the time period of the first RF signal being transmitted from the terminal 130 to the first base station 110-1 may be discarded (it may be close to 0) for simply computation. In this case, the target distance D may be determined as follows:

$$D = (\Delta T_1 - \Delta T_d) \times V_s \quad (7).$$

In 505, the first base station 110-1 may transmit a next ultrasound signal, i.e., the system 100 may start a new process to determine the target distance.

The process 500 may determine the target distance between the terminal 130 and the first base station 110-1 using ultrasound signal and RF signal. In process 500, the first base station 110-1 may be configured to transmit ultrasound signal and receive RF signal, while the terminal 130 may be configured to receive ultrasound signal and transmit RF signal. The terminal 130 may stay in a sleep mode until the terminal 130 receives the ultrasound signal, and after the terminal 130 transmits the RF signal, the terminal 130 may turn on the sleep mode again. Thus it may greatly reduce power cost of the terminal 130.

It should be noted that the above description of process 500 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the process 500. In the storing operation, the processing engine 120 or the processing module 330 may store information and/or data associated with the first ultrasound signal or the first RF signal in a storage as described elsewhere in the present disclosure.

Figure 6:
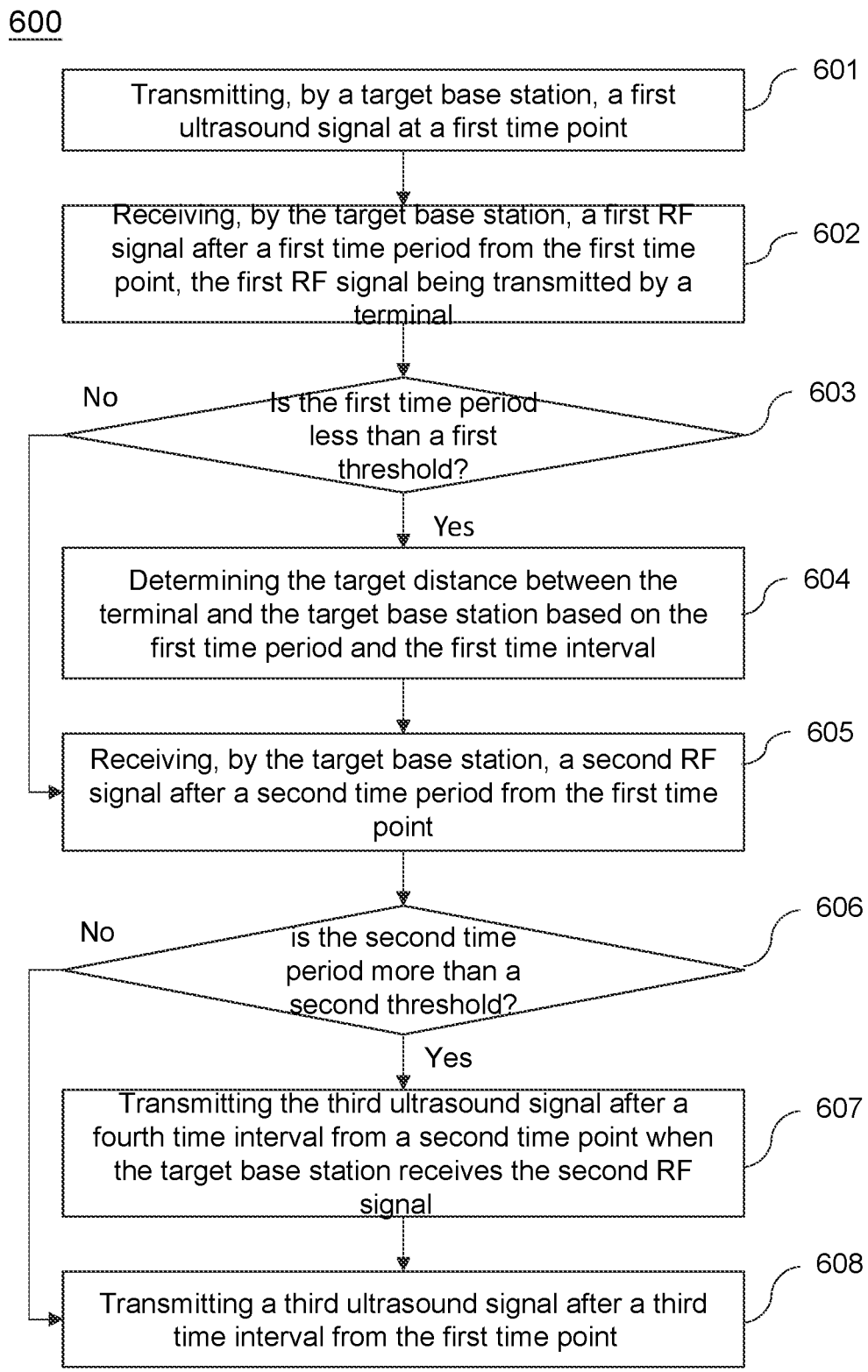
FIG. 6 is a flow chart illustrating an exemplary process for transmitting a next ultrasound signal by the target base station according to some embodiments of the present disclosure.

FIG. 6 is a flow chart illustrating an exemplary process for transmitting a next ultrasound signal by the target base station according to some embodiments of the present disclosure. In some embodiments, the process 600 may be executed by the system 100. For example, the process 600 may be implemented as a set of instructions (e.g., an application) stored in a storage device (e.g., the storage 270, the ROM 230, the RAM 240, the storage module 340). In some embodiments, the processing engine 120 or the plurality of base stations 110 may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 as illustrated in FIG. 6 and described below is not intended to be limiting.

In some embodiments, the system 100 may include a plurality of base stations 110, and more than one base station may transmit an ultrasound signal. The ultrasound signal may have no specific information, and the terminal 130 may be configured to transmit RF signal after receiving ultrasound signal. Since the first base station 110-1 may determine the target distance between the terminal 130 and the first base station 110-1 using the RF signal transmitted by the terminal 130 after the terminal 130 receiving the ultrasound signal transmitted by the first base station 110-1, other ultrasound signals transmitted by other base stations may affect the first base station 110-1 to determine the target distance. Thus, the plurality of base stations 110 may conflict with each other because multiple ultrasound signals transmitted by different base stations of the plurality of base stations 110 may all cause the terminal 130 to transmit RF signals. The process 600 described herein may be implemented on the system 100 to avoid the conflicting between different base stations of the plurality of base stations 110 and each base station may accurately determine a target distance between the terminal 130 and the base station.

In 601-604, the operations are essentially the same as operations 501-504 of the process 500, and the descriptions thereof will not be repeated.

In 605, the first base station 110-1 may receive a second RF signal after a second time period $\Delta T_2$ from the first time point, wherein the second RF signal is transmitted by the terminal 130 after a second time interval $\Delta T_{d2}$ from the terminal 130 receiving a second ultrasound signal. As shown in FIG. 7, the first base station 110-1 may receive the second RF signal at a second time point $T_2$ or $T_2'$. The second time period $\Delta T_2$ may be a time period from the first time point $T_1$ to the second time point $T_2$ or $T_2'$.

In some embodiments, the second ultrasound signal may be transmitted by a second base station of the plurality of base stations 110 (e.g., the second base station 110-2). The second base station 110-2 may transmit the second ultrasound signal before or after the first time point, or at the first time point.

In some embodiments, the terminal 130 may also receive the second ultrasound signal and may be configured to transmit the second RF signal after the second time interval $\Delta T_{d2}$. The second time interval $\Delta T_{d2}$ may include a random interval or a preset interval determined by the terminal 130 or by the system 100. In some embodiments, the random interval may be any time interval, such as 0.01 s, 0.02 s, 0.03 s, etc. The system 100 or the terminal 130 may determine a range of the random interval and determine the second time interval $\Delta T_{d2}$ from the range. In some embodiments, the preset interval may be an interval preset by the system 100 or by the terminal 130. The system 100 or the terminal 130 may determine a range of the preset interval and determine the second time interval $\Delta T_{d2}$ from the range. The range of the second time interval $\Delta T_{d2}$ may be the same as the range of the first time interval $\Delta T_d$. In some embodiments, the second time interval $\Delta T_{d2}$ may be the same as or different from the first time interval $\Delta T_d$. For example, the second time interval $\Delta T_{d2}$ may be less than the first time interval $\Delta T_d$. As another example, the second time interval $\Delta T_{d2}$ may be greater than the first time interval $\Delta T_d$.

In some embodiments, the first base station 110-1 may also receive the second RF signal after the second time period $\Delta T_2$ from the first time point. The process of determining the second time period $\Delta T_2$ may be essentially the same as the process of determining the first time period $\Delta T_1$, and descriptions thereof will not be repeated. In some embodiments, the second time period $\Delta T_2$ may be larger than the first time period $\Delta T_1$.

In some embodiments, the second RF signal may include the information of the terminal 130 or the value of the second time interval $\Delta T_2$. The first base station 110-1 may analyze the second RF signal to determine the information of the terminal 130 or the second time interval $\Delta T_2$.

In 606, the processing engine 120 or the processing module 330 may determine whether the second time period $\Delta T_2$ is more than a second threshold. If the second time period $\Delta T_2$ is more than the second threshold, the process 600 may proceed to 607. Otherwise, the process 600 may proceed to 608.

In some embodiments, the second threshold may be determined by the system 100 or by a user based on a third time interval and a fourth time interval.

In some embodiments, the third time interval may be a default time interval between a base station (e.g., the first base station 110-1) transmitting two adjacent ultrasound signals. As shown in FIG. 7, the third time interval may be a time interval from time point A to time point D. In some embodiments, the first base station 110-1 may transmit the first ultrasound signal at time point A, and may transmit a next ultrasound signal at time point D. The third time interval may be determined by the system 100 or by a user. The third time interval may be determined based on a count of base stations of the plurality of base stations 110 in a predetermined range and the first thresholds corresponding to the count of base stations of the plurality of base stations 110. The predetermined range may be a range where the count of base station(s) of the plurality of base stations 110 that may conflict with the target base station by transmitting ultrasound signals. For example, if ultrasound signals transmitted by 9 base stations in the predetermined range may conflict with the ultrasound signal transmitted by the target base station, the count of base stations in the predetermined range may be 10. In some embodiments, the first thresholds corresponding to different base stations may be different. The third time interval may be determined based on the count of base stations of the plurality of base stations 110 in the predetermined range and the maximum first threshold. The third time interval may be any value that is larger than or equal to a value determined by multiplying the count of base stations of the plurality of base stations 110 in the predetermined range by the maximum first threshold. For example, the count of base stations of the plurality of base stations 110 in the predetermined range may be 10, the maximum first threshold corresponding to a base station of the plurality of base stations 110 may be 0.2 s, then the third time interval may be determined from a range larger than or equal to 2 s, such as 2 s or 3 s. In some embodiments, the first thresholds corresponding to different base stations may be the same. The third time interval may be determined based on the count of base stations of the plurality of base stations 110 in the predetermined range and the first threshold. The third time interval may be any value that is larger than or equal to a value determined by multiplying the count of base stations of the plurality of base stations 110 in the predetermined range by the first threshold. For example, the count of base stations of the plurality of base stations 110 in the predetermined range may be 10, the first threshold corresponding to the plurality of base stations 110 may be 0.2 s, then the third time interval may be determined from a range larger than or equal to 2 s, such as 2 s or 3 s. In some embodiments, it may denote that the plurality of base stations 110 may transmit ultrasound signals without conflicting with each other in the third time interval. This may achieve that in a time period of the maximum first threshold, only one base station of the plurality of base stations 110 transmits ultrasound signal. Such that if the only one base station receives a RF signal in the first time period $\Delta T_1$ that less than the first threshold, it is sure that the RF signal is transmitted by the terminal 130 after the terminal 130 receives the ultrasound signal transmitted by the only one base station. Then the target distance between the terminal 130 and the only one base station may be determined.

In some embodiments, the fourth time interval may be a time interval that between the first time points when any two base stations (e.g., the first base station 110-1 and the second base station 110-2) of the plurality of base stations 110 transmit ultrasound signals. As shown in FIG. 7, the fourth time interval may be a time interval from time point C to time point D. The fourth time interval may be determined by the system 100 or by a user. The fourth time interval may be determined based on the third time interval, the count of base stations of the plurality of base stations 110 in the predetermined range and the first thresholds corresponding to the plurality of base stations 110. In some embodiments, the first thresholds corresponding to different base stations may be different. The fourth time interval may be determined in a range larger than or equal to the maximum first threshold and less than or equal to a value of the third time interval divided by the count of base stations of the plurality of base stations 110 in the predetermined range. For example, the third time interval may be 3 s, the count of base stations of the plurality of base stations 110 in the predetermined range may be 10, the maximum first threshold corresponding to a base station of the plurality of base stations 110 may be 0.2 s, then the fourth time interval may be determined from the range larger than or equal to 0.2 s and less than or equal to 0.3 s, such as 0.2 s or 0.25 s. In some embodiments, the first thresholds corresponding to different base stations may be the same. The fourth time interval may be determined in a range larger than or equal to the first threshold and less than or equal to a value of the third time interval divided by the count of base stations of the plurality of base stations 110 in the predetermined range. For example, the third time interval may be 3 s, the count of base stations of the plurality of base stations 110 in the predetermined range may be 10, the first threshold of the plurality of base stations 110 may be 0.2 s, then the fourth time interval may be determined from the range larger than or equal to 0.2 s and less than or equal to 0.3 s, such as 0.2 s or 0.25 s. In some embodiments, it may denote that if a time interval between a time point of a first base station (e.g., the first base station 110-1) of the plurality of base stations 110 transmitting an ultrasound signal and a time point of a second base station (e.g., the second base station 110-2) of the plurality of base stations 110 transmitting an ultrasound signal are the fourth time interval, the first base station and the second base station of the plurality of base stations 110 may transmit ultrasound signals without conflicting with each other.

In some embodiments, the second threshold may be determined based on the third time interval and the fourth time interval. The second threshold may be determined by subtracting the fourth time interval from the third time interval. For example, the third time interval may be 3 s, the fourth time interval may be 0.2 s, and the second threshold may be 2.8 s. As shown in FIG. 7, the second threshold may be a time period from time point A to time point C.

In 607, the first base station 110-1 (e.g., the transmission module 310) may transmit a third ultrasound signal after the fourth time interval from a second time point when the first base station 110-1 receives the second RF signal. The third ultrasound signal may refer to the next ultrasound signal the first base station 110-1 transmitting after the first ultrasound signal.

In some embodiments, if the second time period $\Delta T_2$ is more than the second threshold, the first base station 110-1 may receive the second RF signal at the second time point $T_2'$, as shown in FIG. 7. In order to avoiding the conflicting caused by the second ultrasound signal transmitted by the second base station 110-2 and the third ultrasound signal transmitted by the first base station 110-1, the first base station 110-1 may transmit the third ultrasound signal after the fourth time interval from the second time point $T_2'$, instead of time point D. Since the fourth time interval is larger than or equal to the first threshold, when the first base station 110-1 transmits the third ultrasound signal after the fourth time interval from the first base station 110-1 receiving the second RF signal, it may not conflict with the second ultrasound signal transmitted by the second base station 110-2.

In some embodiments, before the first base station 110-1 transmitting the first ultrasound signal, the first base station 110-1 may also receive an additional RF signal transmitted by the terminal 130. Since the first base station 110-1 did not transmit an ultrasound signal yet, the additional RF signal may be transmitted by the terminal 130 after the terminal 130 receives an additional ultrasound signal transmitted by another base station of the plurality of base stations 110 (e.g., the third base station 110-3), other than transmitted by the first base station 110-1. In some embodiments, the first base station 110-1 may transmit the first ultrasound signal after a fifth time interval from the time point when the first base station 110-1 receives the additional RF signal to avoid conflicting with the additional ultrasound signal transmitted by the third base station 110-3. In some embodiment, the fifth time interval may be determined by the system 100 or by a user. In some embodiments, the fifth time interval may include the fourth time interval, or a value greater or equal to the first threshold.

In 608, the first base station 110-1 may transmit the third ultrasound signal after the third time interval from the first time point. In some embodiments, referring to FIG. 7, if the second time period $\Delta T_2$ is no more than the second threshold, the first base station 110-1 may receive the second RF signal at the second time point $T_2$. Since the time period from the second time point $T_2$ to time point D is larger than the fourth time interval, the first base station 110-1 may transmit the third ultrasound signal after the third time interval from the first time point (e.g., the time point $T_1$), i.e., at time point D. In some embodiments, the first base station 110-1 may further transmit the third ultrasound signal after a sum of the third time interval and a random value from the first time point (e.g., the time point $T_1$), instead of time point D. The random value may be determined by the processing engine 120 or the processing module 330. The random value may be in a predetermined range. The adding of the random value may better avoid the conflicting of two base stations. For example, the processing engine 120 or the processing module 330 may further determine whether the second time period $\Delta T_2$ is more than the first threshold. If the second time period $\Delta T_2$ is no more than the first threshold, the first base station 110-1 may transmit the third ultrasound signal after a sum of the third time interval and the random value from the first time point (e.g., the time point $T_1$), instead of time point D. In some embodiments, the random value for different base station of the plurality of base stations 110 may be different or the same.

FIG. 7 is a schematic diagram illustrating an exemplary time line of a base station according to some embodiments of the present disclosure. As shown in FIG. 7, the base station (e.g., the first base station 110-1) may transmit a first ultrasound signal at a first time point $T_1$ (e.g., time point A), and receive a first RF signal at time point $T_3$. In some embodiments, the first base station 110-1 may further receive a second RF signal at a second time point $T_2$ or $T_2'$. The first base station 110-1 may also transmit a third ultrasound signal (e.g., a next ultrasound signal) after a third time interval from the first time point $T_1$, i.e., at time point D. A time period from time point A to time point B may refer to the first threshold of the first base station 110-1, and a time period from time point A to time point C may refer to the second threshold of the first base station 110-1. A time period from time point C to time point D may refer to the fourth time interval.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed object matter requires more features than are expressly recited in each claim. Rather, claim object matter lie in less than all features of a single foregoing disclosed embodiment.

We claim:

1. A method for determining a position of a terminal, the method comprising:
   receiving, by a first base station configured to communicate with other objects via a network, a first signal transmitted from the terminal;
   analyzing the received first signal to identify identity information of the terminal;
   receiving, by the first base station and via the network, a second signal from a second base station, wherein the second signal is transmitted by the second base station after the second base station receives the first signal;
   analyzing the received second signal to identify the identity information of the terminal and identity information of the second base station;
   determining a time duration between the first base station receiving the first signal and receiving the second signal;
   obtaining, based on the identity information of the second base station, a position of the second base station;
   determining a time difference between a first time period of the first signal transmitted from the terminal to the first base station and a second time period of the first signal transmitted from the terminal to the second base station based on a third time period and the time duration, wherein the third time period is a time period of the second signal transmitted from the second base station to the first base station; and
   determining the position of the terminal based on a position of the first base station, the position of the second base station, and the time difference between the first time period of the first signal transmitted from the terminal to the first base station and the second time period of the first signal transmitted from the terminal to the second base station.

2. The method of claim 1, wherein the second signal is transmitted by the second base station after a time interval from the second base station receiving the first signal.

3. The method of claim 2, wherein the time interval is a random interval or a preset interval.

4. The method of claim 2, further comprising determining the time difference based on the time interval.

5. The method of claim 2, wherein the second signal further includes the time interval.

6. The method of claim 5, further comprising determining the third time period based on the position of the second base station and a position of the first base station, or determining the third time period based on an interaction signal between the first base station and the second base station.

7. The method of claim 1, wherein the determining the time difference further comprising:
   determining whether the time duration is more than a threshold;
   in response to a determination that the time duration is less than or equal to the threshold, determining the time difference based on the third time period and the time duration.

8. The method of claim 1, further comprising synchronizing the first base station and the second base station based on the time difference.

9. A method implemented on a system having a target base station for determining a target distance between a terminal and the target base station, comprising:
   transmitting, by the target base station, a first ultrasound signal at a first time point;
   receiving, by the target base station, a first radiofrequency (RF) signal after a first time period from the first time point, wherein the first RF signal is transmitted by the terminal after a first time interval from the terminal receiving the first ultrasound signal;
   determining whether the first time period is less than a first threshold; and
   in response to a determination that the first time period is less than the first threshold, determining the target distance between the terminal and the target base station based on the first time period and the first time interval.

10. The method of claim 9, wherein the first RF signal includes information of the terminal or the first time interval.

11. The method of claim 9, wherein the first time interval is a random interval or a preset interval.

12. The method of claim 9, wherein the first threshold is determined based on the first time interval and an effective working range of the target base station.

13. The method of claim 9, further comprising:
   receiving, by the target base station, a second RF signal after a second time period from the first time point, wherein the second RF signal is transmitted by the terminal after a second time interval from the terminal receiving a second ultrasound signal.

14. The method of claim 13, wherein the second ultrasound signal is transmitted by another base station of the system.

15. The method of claim 13, further comprising:
determining whether the second time period is more than a second threshold; and
in response to a determination that the second time period is less than or equal to the second threshold, transmitting, by the target base station, a third ultrasound signal after a third time interval from the first time point; and
in response to a determination that the second time period is more than the second threshold, transmitting, by the target base station, the third ultrasound signal after a fourth time interval from a second time point when the target base station receives the second RF signal,
wherein
the third time interval is determined based on a count of base stations in a predetermined range and the first threshold,
the fourth time interval is determined based on the third time interval, the count of base stations in the predetermined range, and the first threshold, and
the second threshold is determined based on the third time interval and the fourth time interval.

16. The method of claim 15, wherein the third time interval, the fourth time interval, or the second threshold is determined by the system or by a user.

17. The method of claim 15, further comprising:
in response to a determination that the second time period is no more than the second threshold, transmitting, by the target base station, the third ultrasound signal after a sum of the third time interval and a random value from the first time point.

18. The method of claim 9, further comprising:
receiving, by the target base station, a third RF signal at a third time point; and
transmitting, by the target base station, the first ultrasound signal at the first time point,
wherein the first time point is a time point after a fifth time interval from the third time point, and the fifth time interval is determined based on a count of base stations in a predetermined range and the first threshold.

19. The method of claim 9, wherein the terminal is further configured to turn on a sleep mode after transmitting the first RF signal.

20. A system for determining a time difference, comprising:
a first base station configured to receive a first signal transmitted from a terminal and receive a second signal from a second base station, wherein the first signal includes identity information of the terminal;
the second base station configured to receive the first signal transmitted from the terminal, and transmit the second signal after receiving the first signal, wherein the second signal includes the identity information of the terminal; and
at least one processor configured to:
determine a time duration between the first base station receiving the first signal and receiving the second signal; and
determine a time difference between a first time period of the first signal transmitted from the terminal to the first base station and a second time period of the first signal transmitted from the terminal to the second base station based on a third time period and the time duration, wherein the third time period is a time period of the second signal transmitted from the second base station to the first base station.

\* \* \* \* \*